(12) United States Patent
Stanford et al.

(10) Patent No.: US 11,727,931 B2
(45) Date of Patent: *Aug. 15, 2023

(54) MOTORIZED COMPUTING DEVICE THAT AUTONOMOUSLY ADJUSTS DEVICE LOCATION AND/OR ORIENTATION OF INTERFACES ACCORDING TO AUTOMATED ASSISTANT REQUESTS

(71) Applicant: Google LLC, Mountain View, CA (US)

(72) Inventors: Scott Stanford, Mountain View, CA (US); Keun-Young Park, Santa Clara, CA (US); Vitalii Tomkiv, San Jose, CA (US); Hideaki Matsui, San Francisco, CA (US); Angad Sidhu, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,967

(22) Filed: Nov. 1, 2021

(65) Prior Publication Data

US 2022/0165266 A1 May 26, 2022

Related U.S. Application Data

(63) Continuation of application No. 16/613,281, filed as application No. PCT/US2019/029606 on Apr. 29, 2019, now Pat. No. 11,164,582.

(51) Int. Cl.
*G10L 15/22* (2006.01)
*B25J 11/00* (2006.01)
*G05D 1/02* (2020.01)

(52) U.S. Cl.
CPC .......... *G10L 15/22* (2013.01); *B25J 11/0005* (2013.01); *G05D 1/0246* (2013.01)

(58) Field of Classification Search
CPC .... G10L 15/22; B25J 11/0005; G05D 1/0246; G05D 2201/02; G05D 1/0255;
(Continued)

(56) References Cited

U.S. PATENT DOCUMENTS

| 8,942,849 B2 | 1/2015 | Maisonnier et al. |
| 2010/0180709 A1* | 7/2010 | Choi .......................... B25J 9/06 74/490.05 |

(Continued)

FOREIGN PATENT DOCUMENTS

| JP | 2001300874 A | 10/2001 |
| JP | 2014013494 A | 1/2014 |

(Continued)

OTHER PUBLICATIONS

Zenbo: www.youtube.com/watch?v=Tld77f78fy0 (Year: 2016).*

(Continued)

*Primary Examiner* — Bhavesh M Mehta
*Assistant Examiner* — Darioush Agahi
(74) *Attorney, Agent, or Firm* — Gray Ice Higdon

(57) ABSTRACT

Set forth is a motorized computing device that selectively navigates to a user according content of a spoken utterance directed at the motorized computing device. The motorized computing device can modify operations of one or more motors of the motorized computing device according to whether the user provided a spoken utterance while the one or more motors are operating. The motorized computing device can render content according to interactions between the user and an automated assistant. For instance, when automated assistant is requested to provide graphical content for the user, the motorized computing device can navigate to the user in order to present the content the user. However, in some implementations, when the user requests audio content, the motorized computing device can bypass navigating (Continued)

to the user when the motorized computing device is within a distance from the user for audibly rendering the audio content.

13 Claims, 9 Drawing Sheets

(58) Field of Classification Search
CPC ......... G05D 1/0016; H04S 7/303; H04S 7/40; H04R 1/02
See application file for complete search history.

(56) References Cited

U.S. PATENT DOCUMENTS

| | | | |
|---|---|---|---|
| 2013/0255426 A1 | 10/2013 | Kassow et al. | |
| 2013/0338525 A1* | 12/2013 | Allen | A61B 5/742 600/534 |
| 2014/0277735 A1* | 9/2014 | Breazeal | H04N 5/23206 700/259 |
| 2017/0133036 A1* | 5/2017 | Cohen | H04N 7/147 |
| 2017/0374276 A1 | 12/2017 | Veeramani et al. | |
| 2018/0231983 A1 | 8/2018 | Sangare et al. | |

FOREIGN PATENT DOCUMENTS

| | | |
|---|---|---|
| JP | 2018067785 A | 4/2018 |
| JP | 2018185362 A | 11/2018 |
| WO | WO2018073832 | 4/2018 |
| WO | 2018182347 A1 | 10/2018 |

OTHER PUBLICATIONS

Intellectual Property India; Examination Report issued in Application No. 202127030722; 7 pages; dated Mar. 8, 2022.
YouTube; https://www.youtube.com/watch?v=Tld77f78fy0; dated 2016.
European Patent Office; International Search Report and Written Opinion of PCT Ser. No. PCT/US2019/029606; 16 pages; dated Mar. 31, 2020.
Faid Com; "Asus Zenbo Your Smart Little Companion;" YouTube; retrieved from internet: URL:https://www.youtube.com/watch?v=Tld77f78fy0; 3 pages; Dec. 12, 2016.
European Patent Office; Invitation to Pay Additional Fees in Ser No. PCT/US2019/029606; 14 pages; dated Feb. 7, 2020.
"Skills—"Hey Jibo, what can you do?"—Jibo" https://www.jibo.com/skills/ Apr. 29, 2019.
European Patent Office; Communication under Rule 164(2)(a) issued in Application No. 19723947.8, 8 pages, dated Sep. 23, 2022.
Japanese Patent Office; Office Action issued in Application No. 2021-542493; 15 pages; dated Nov. 28, 2022.
Nakadai, K. et al., "Real-Time Sound Localization and Separation for Robot Audition"; ICSLP 2002; 7th International Conference on Spoken Language Processing; pp. 193-196; dated Sep. 16, 2002.
European Patent Office; Communication under Rule 164(2)(b) issued in Application No. 19723947.8, 15 pages, dated Dec. 9, 2022.
Japanese Patent Office; Decision of Rejection issued in Application No. 2021-542493; 7 pages; dated May 22, 2023.
European Patent Office; Intention to Grant issued in Application No. 19723947.8, 52 pages, dated May 17, 2023.

* cited by examiner

MOTORIZED COMPUTING DEVICE THAT AUTONOMOUSLY ADJUSTS DEVICE LOCATION AND/OR ORIENTATION OF INTERFACES ACCORDING TO AUTOMATED ASSISTANT REQUESTS

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e. utterances) which may in some cases be converted into text and then processed, and/or by providing textual (e.g., typed) natural language input. Although the use of automated assistants can allow for easier access to information and more convenient means for controlling peripheral devices, perceiving display content and/or audio content can be arduous in certain situations.

For example, when a user is preoccupied with certain tasks in a room of their home, and desires to obtain helpful information about the tasks via a computing device that is in a different room, the user may not be able to reasonably and/or safely access the computing device. This can be especially apparent in situations in which the user is performing skilled labor and/or has otherwise expended energy to be in their current situation (e.g., standing on a ladder, working under a vehicle, painting their home, etc.). Should the user request certain information while working in such situations, the user may not be able to suitably hear and/or see the rendered content. For instance, while a user may have a computing device in their garage, for viewing helpful content when working in their garage, the user may not be able to see a display panel of the computing device when standing at certain locations within the garage. As a result, the user may unfortunately need to pause the progress of their work in order to view the display panel for perceiving information provided via the computing device. Furthermore, depending on an amount of time that the content is rendered, the particular user may not have time to suitably perceive the content-assuming they must first navigate around various fixtures and/or persons to reach the computing device. In such situations, if the user does not have the chance to perceive the content, the user may end up having to re-request the content, thereby wasting computational resources and power of the computing device.

SUMMARY

Implementations set forth herein relate to a mobile computing device that selectively navigates to a user for rendering certain content to a user, and adjusts a viewing angle of a display panel of the mobile computing device according to a relative position of the user. The mobile computing device can include multiple sections (i.e., housing enclosures), and each section can include one or more motors for adjusting a physical position and/or arrangement one or more sections. As an example, a user can provide a spoken utterance such as, "Assistant, what is my schedule for today?" and, in response, the mobile computing device can navigate toward a location of the user, adjust an angle of a display panel of the mobile computing device, and render display content that characterizes the schedule of the user.

However, the mobile computing device can bypass navigating to the user when the user requests audio content (e.g., audio content with no corresponding display content), and the mobile computing device determines that a current location of the mobile computing device corresponds to a distance at which the audio content would be audible to the user. In instances when the mobile computing device is not within the distance for rendering audible audio content, the mobile computing device can determine a location of the user and navigate toward the user, at least until the mobile computing device is within a particular distance for rendering audible audio content.

In order for the mobile computing device to determine how to operate motors of the mobile computing device to arrange portions of the mobile computing device for rendering content, the mobile computing device can process data that is based on one or more sensors. For instance, the mobile computing device can include one or more microphones (e.g., an array of microphones) that are responsive to sounds originating from different directions. One or more processors can process outputs from the microphones to determine an origin of a sound relative to the mobile computing device. In this way, should the mobile computing device determine that a user has requested content that should be rendered more proximate to the user, the mobile computing device can navigate to the location of the user, as determined based on output from the microphones. Allowing a mobile computing device to maneuver in this way can provide relief for impaired users that may not be able to efficiently navigate to a computing device for information and/or other media. Furthermore, because the mobile computing device can make determinations regarding when to navigate to the user and when to not, at least when rendering content, the mobile computing device can preserve power and other computational resources. For instance, if the mobile computing device navigated to the user indiscriminately with respect to a type of content to be rendered, the mobile computing device may consume more power navigating to the user compared to exclusively rendering the content without navigating to the user. Moreover, rendering content without first navigating to the user when it is not necessary to do so can avoid unneeded delay in the rendering of that content.

In some implementations, the mobile computing device can include a top housing enclosure that includes a display panel, which can have a viewing angle that is adjustable via a top housing enclosure motor. For instance, when the mobile computing device determines that the user has provided a spoken utterance and that the viewing angle of the display panel should be adjusted in order for the display panel to be directed at the user, the top housing enclosure motor can adjust a position of the display panel. When the mobile computing device has completed rendering of particular content, the top housing enclosure motor can maneuver the display panel back to a resting position, which can consume less space than when the display panel has been adjusted toward a direction of the user.

In some implementations, the mobile computing device can further include a middle housing enclosure and/or a bottom housing enclosure, which can each house one or more portions of the mobile computing device. For instance, the middle housing enclosure and/or the bottom housing enclosure can include one or more cameras for capturing images of a surrounding environment of the mobile computing device. Image data generated based on an output of a camera of the mobile computing device can be used to determine a location of the user, in order to allow the mobile computing device navigate toward the location when the user provides certain commands to the mobile computing device. In some implementations, the middle housing enclosure and/or bottom housing enclosure can be located below the top housing enclosure when the mobile computing device is operating in a sleep mode; and the middle housing enclosure and/or the bottom housing enclosure can include one or more motors for rearranging the mobile computing device, including the top housing enclosure, when transitioning out of the sleep mode. For example, in response to the user providing an invocation phrase such as, "Assistant . . . ," the mobile computing device transition out of a sleep mode and into an operating mode. During the transition, one or more motors of the mobile computing device can cause the camera and/or the display panel to be directed toward the user. In some implementations, a first set of motors of the one or more motors can control an orientation of the camera, and a second set of motors of the one or more motors can control a separate orientation of the display panel. In this way, the camera can have a separate orientation relative to an orientation of the display panel. Additionally, or alternatively, the camera can have the same orientation relative to an orientation of the display panel, according to a motion of the one or more motors.

Furthermore, during the transition from a compact arrangement of the mobile computing device to an extended arrangement of the mobile computing device, one or more microphones of the mobile computing device can monitor for further input from the user. When further input is provided by the user during operation of one or motors of the mobile computing device, noise from the motors may interrupt certain frequencies of the spoken input from the user. Therefore, in order to eliminate negative effects on the quality of the sound captured by the microphones of the mobile computing device, the mobile computing device can modify and/or pause operations of one or more motors of the mobile computing device while the user is providing the subsequent spoken utterance.

For example, subsequent to the user providing the invocation phrase, "Assistant . . . ," and while a motor of the mobile computing device operating to extend the display panel toward a direction of the user, the user can provide a subsequent spoken utterance. The subsequent spoken utterance can be, " . . . show the security camera in front of the house," which can cause an automated assistant to invoke an application for viewing live streaming video from a security camera. However, because the motor of the mobile computing device is operating while the user is providing the subsequent spoken utterance, the mobile computing device can determine that the user is providing a spoken utterance and, in response, modify one or more operations of one or more motors of the mobile computing device. For instance, the mobile computing device can stop an operation of a motor that is causing the display panel to extend in the direction of the user, in order to eliminate motor noise that would interrupt the mobile computing device when generating audio data characterizing the spoken utterance. When the mobile computing device determines that the spoken utterance is no longer being provided by the user and/or is otherwise complete, operations of one or more motors of the mobile computing device can continue.

Each motor of the mobile computing device can perform various tasks in order to effectuate certain operations of the mobile computing device. In some implementations, the bottom housing enclosure of the mobile computing device can include one or more motors that are connected to one or more wheels (e.g., cylindrical wheel(s), ball wheel(s), mecanum wheel(s), etc.) for navigating the mobile computing device to a location. The bottom housing enclosure can also include one or more other motors for maneuvering a middle housing enclosure of the mobile computing device (e.g., rotating the middle housing enclosure about an axis that is perpendicular to a surface of the bottom housing enclosure).

In some implementations, the mobile computing device can perform one or more different responsive gestures in order to indicate that the mobile computing device is receiving an input from the user, thereby acknowledging the input. For example, in response to detecting a spoken utterance from the user, the mobile computing device can determine whether the user is within a viewing range of a camera of the mobile computing device. If the user is within a viewing range of the camera, the mobile computing device can operate one or more motors in order to invoke physical motion by the mobile computing device, thereby indicating to the user that the mobile computing device is acknowledging the input.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
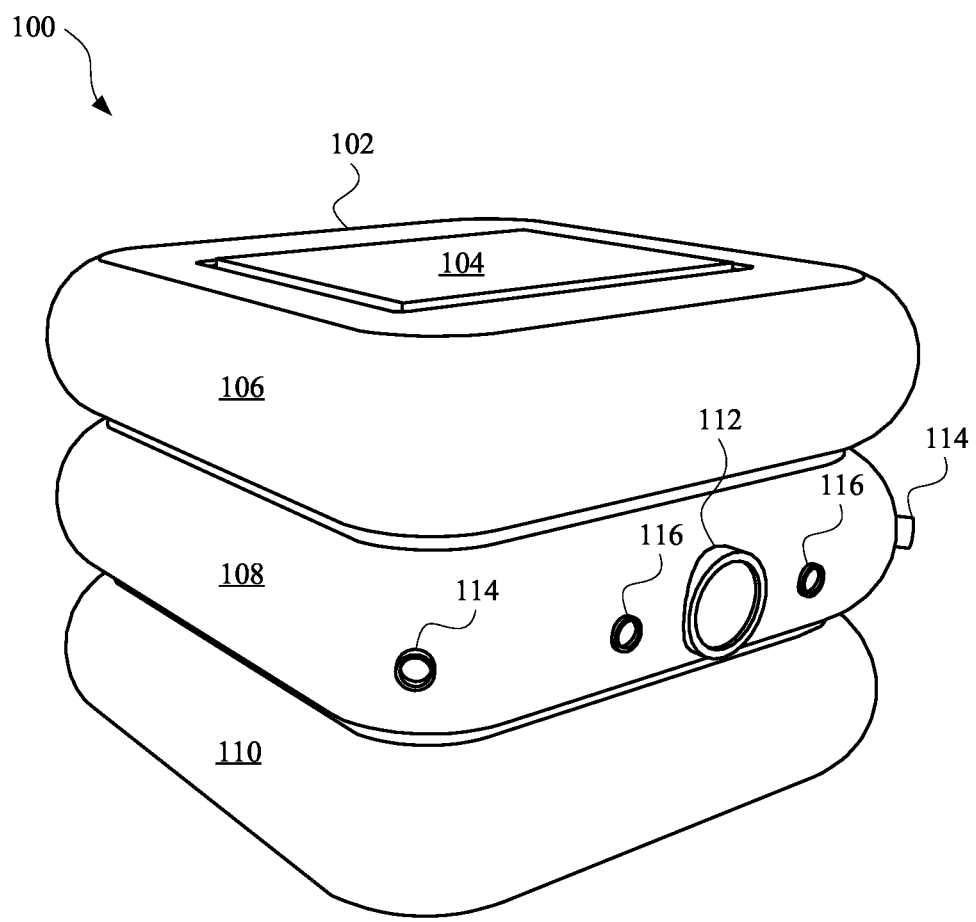
FIG. 1A, FIG. 1B, and FIG. 1C illustrate views of a mobile computing device that autonomously and selectively navigates in response to commands from one or more users.
Figure 1B:
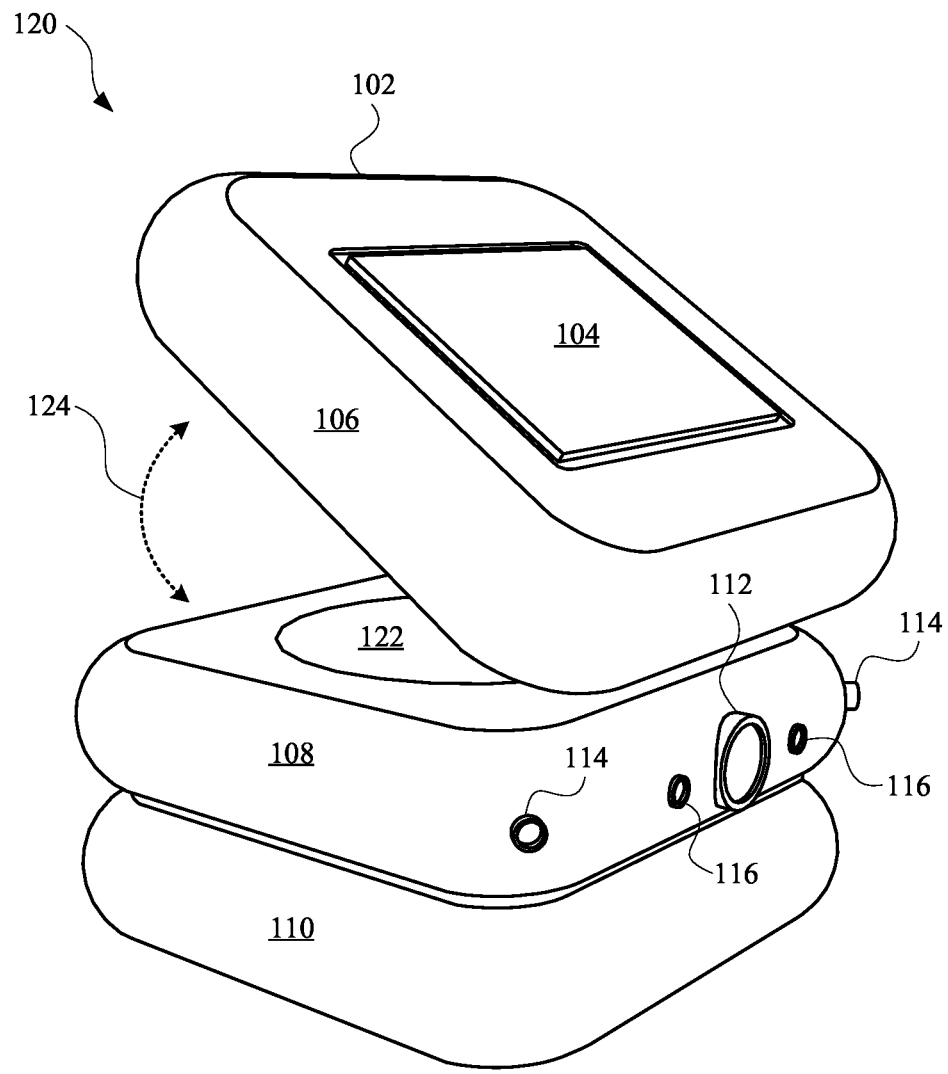
Figure 1C:
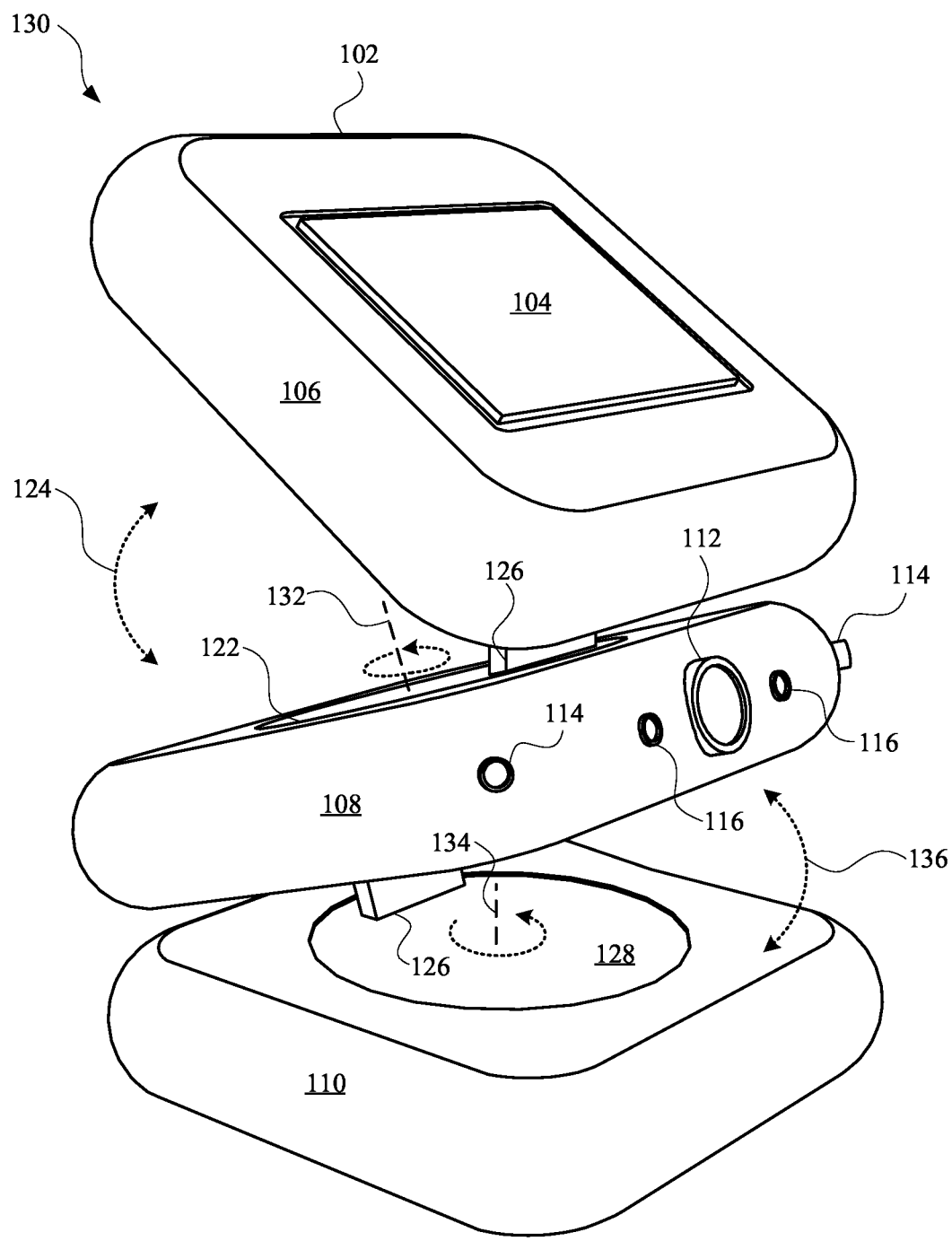

FIGS. 1A, 1B, and 1C illustrate views of a mobile computing device 102 that autonomously and selectively navigates in response to commands from one or more users. Specifically, FIG. 1A illustrates a perspective view 100 of the mobile computing device 102 in a collapsed state, in which the housing enclosures of the mobile computing device 102 can be most proximate to each other. In some implementations, the mobile computing device 102 can include one or more housing enclosures comprising, but not limited to, one or more of a first housing enclosure 106, a second housing enclosure 108, and/or a third housing enclosure 110. One or more of the housing enclosures can include one or more motors for maneuvering a particular housing enclosure into a particular position and/or toward a particular destination.

In some implementations, the first housing enclosure 106 can include one or more first motors (i.e., a single motor, or multiple motors) that operate to adjust an orientation of a display panel 104 of the mobile computing device 102. The first motor of the first housing enclosure 106 can be controlled by one or more processors of the mobile computing device 102 and can be powered by a portable power supply of the mobile computing device 102. The portable power supply can be a rechargeable power source, such as a battery and/or a capacitor, and a power management circuit of the mobile computing device 102 can adjust an output of the portable power supply for providing power to the first motor, and/or any other motors of the mobile computing device 102. During operations of the mobile computing device 102, the mobile computing device 102 can receive inputs from a user and determine a response to provide to the user. When the response includes display content, the first motor can adjust the display panel 104 to be directed at the user. For example, as illustrated in view 120 of FIG. 1B, the display panel 104 can be maneuvered in a direction that increases an angle of separation 124 between the first housing enclosure 106 and the second housing enclosure 108. However, when the response includes audio content, without providing corresponding display content, the mobile computing device 102 can remain in a compressed state (as shown in FIG. 1A) without the first motor adjusting the orientation of the display panel 104.

In some implementations, the second housing enclosure 108 can include one or more second motors for maneuvering an orientation of the first housing enclosure 106 and/or the second housing enclosure 108 relative to the third housing enclosure 110. For example, as illustrated in view 130 of FIG. 1C, the one or more second motors can include a motor that maneuvers the first housing enclosure 106 about an axis 132 that is perpendicular to a surface of the second housing enclosure 108. Therefore, a first motor embodied in the first housing enclosure 106 can modify an angle of separation between the first housing enclosure 106 and the second housing enclosure 108, and a second motor embodied in the second housing enclosure 108 can rotate the first housing enclosure 106 about the axis 132.

In some implementations, the mobile computing device 102 can include a third housing enclosure 110 that includes one or more third motors that maneuver the first housing enclosure 106, the second housing enclosure 108, and/or the third housing enclosure 110, and/or also navigate the mobile computing device 102 to one or more different destinations. For instance, the third housing enclosure 110 can include one or more motors for maneuvering the second housing enclosure 108 about another axis 134. The other axis 134 can intersect a rotatable plate 128, which can be attached to a third motor that is enclosed within the third housing enclosure 110. Furthermore, the rotatable plate 128 can be connected to an arm 126, on which the second housing enclosure 108 can be mounted. In some implementations, a second motor enclosed within the second housing enclosure 108 can be connected to the arm 126, which can operate as a fulcrum to allow an angle of separation 136 between the third housing enclosure 110 and the second housing enclosure 108 to be adjusted.

In some implementations, the mobile computing device 102 can include another arm 126, which can operate as another fulcrum, or other apparatus, that assists a second motor with adjusting an angle of separation 124 between the first housing enclosure 106 and the second housing enclosure 108. An arrangement of the mobile computing device 102 can depend on circumstances in which the mobile computing device 102 and/or another computing device received an input. For example, in some implementations the mobile computing device 102 can include one or more microphones that are oriented in different directions. For instance, the mobile computing device 102 can include a first set of one or more microphones 114 oriented in a first direction, and a second set of one or more microphones 116 oriented in a second direction that is different than the first direction. The microphones can be attached to the second housing enclosure 108, and/or any other housing enclosure or combination of housing enclosure.

When the mobile computing device 102 receives an input from a user, signals from one or more microphones can be processed in order to determine a location of the user relative to the mobile computing device 102. When the location is determined, one or more processors of the mobile computing device 102 can cause one or more motors of the mobile computing device 102 to arrange the housing enclosures such that the second set of microphones 116 are directed at the user. Furthermore, in some implementations, the mobile computing device 102 can include one or more cameras 112. The camera 112 can be connected to the second housing enclosure, and/or any other housing enclosures or combination of housing enclosures. In response to the mobile computing device 102 receiving an input and determining the location of the user, the one or more processors can cause one or more motors to arrange the mobile computing device 102 such that the camera 112 is directed at the user.

As one non-limiting example, the mobile computing device 102 can determine that a child has directed a spoken utterance at the mobile computing device 102 while the mobile computing device is on top of a table, which can be taller than the child. In response to receiving the spoken utterance, the mobile computing device 102 can use signals from one or more of microphones 114, microphones 116, and/or camera 112, in order to determine the location of the child relative to the mobile computing device 102. In some implementations, processing of audio and/or video signals can be offloaded to a remote device, such as a remote server, via a network that the mobile computing device 102 is connected. The mobile computing device 102 can determine, based on the processing, that an anatomical feature (e.g., eyes, ears, face, mouth, and/or any other anatomical feature) is located below the table. Therefore, in order to direct the display panel 104 at the user, one or more motors of the mobile computing device 102, can arrange the display panel 104 in a direction that is below the table.

Figure 2:
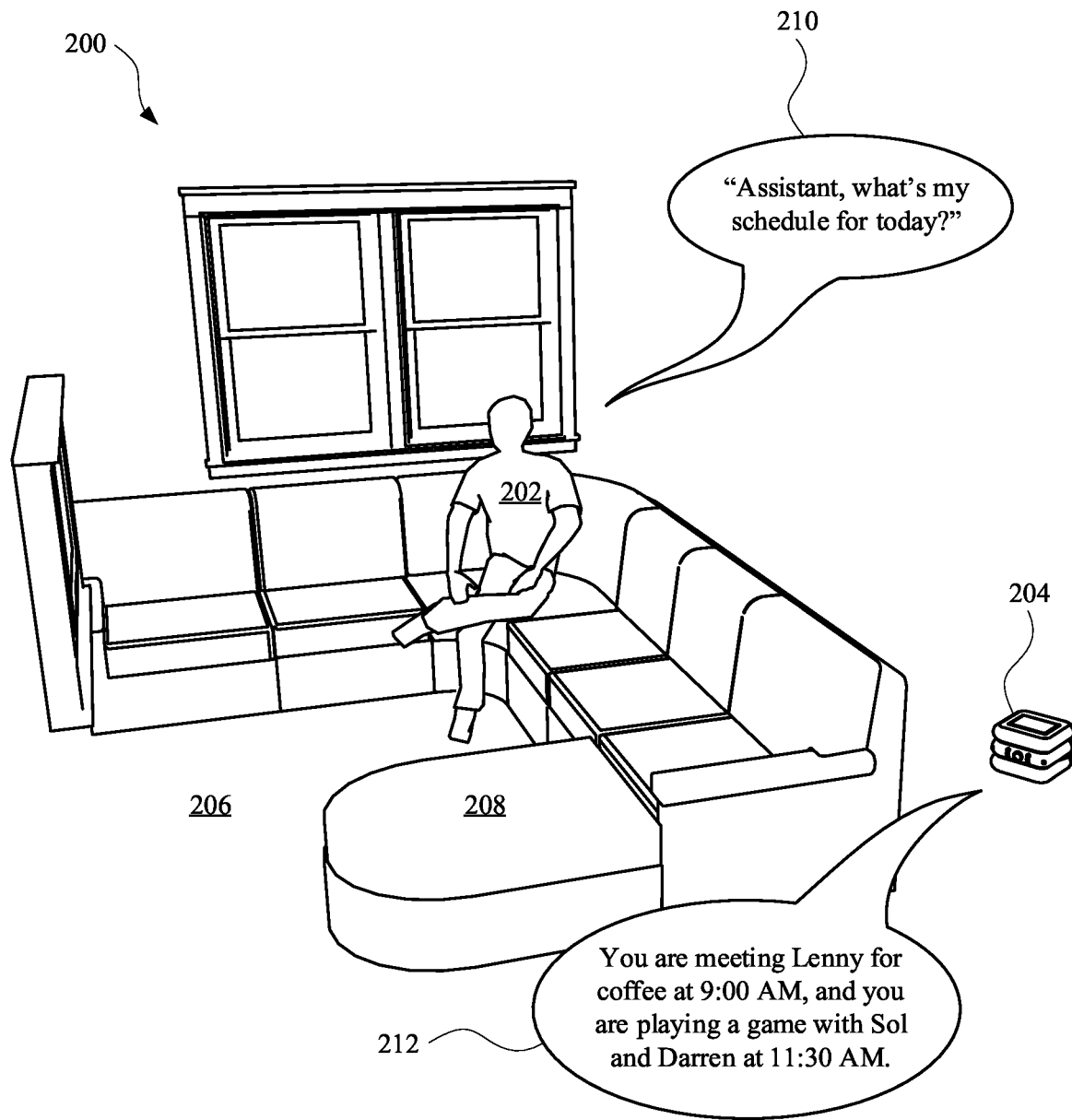
FIG. 2 illustrates a view of a user providing a spoken utterance to a mobile computing device in order to invoke a response from an automated assistant that is accessible via the mobile computing device.

FIG. 2 illustrates a view 200 of a user 202 providing a spoken utterance to a mobile computing device 204 in order to invoke a response from an automated assistant that is accessible via the mobile computing device 204. Specifically, the user 202 can provide a spoken utterance 210, which can be captured via one or more microphones of the mobile computing device 204. The mobile computing device 204, and/or a computing device that is in communication with the mobile computing device 204, can process audio data characterizing the spoken utterance 210. Based on the processing, the mobile computing device 204 can determine one or more actions that are being requested by the user 202. Furthermore, the mobile computing device 204 can determine whether execution of the one or more actions involves rendering graphical content at a display panel of the mobile computing device 204. When the one or more actions do not involve rendering graphical content for the user 202, the mobile computing device 204 can, in some implementations, bypass navigating around obstacles, such as a couch 208, within a room 206 that the user 202 is located.

Instead, the mobile computing device 204 can determine that the one or more actions involve rendering audio content, and further determine whether the user 202 is located within a distance for effectively rendering audible content for the user 202. In other words, the mobile computing device 204 can determine whether the user 202 is located proximate enough to the mobile computing device 204 to hear any audio output generated at the mobile computing device 204. If the user 202 is within the distance for audibly rendering audio content, the mobile computing device 204 can bypass navigating closer to the user 202. However, if the user is not within the distance for audibly rendering audio content, the mobile computing device 204 can control one or more motors of the mobile computing device 204 for navigating closer to the location of the user 202.

When the mobile computing device 204 reaches a distance for audibly rendering audio content for the user 202, or otherwise determines that the mobile computing device 204 is already within the distance for audibly rendering audio content, the mobile computing device 204 can provide a responsive output 212. For example, when the spoken utterance includes natural language content such as, "Assistant, what's my schedule for today?" the automated assistant can provide a responsive output such as, "Okay, you are meeting Lenny for coffee at 9:00 A.M., and you are playing a game with Sol and Darren at 11:30 A.M." In this way, power can be saved at the mobile computing device 204 by selectively navigating or not navigating to the user 202, depending on one or more actions requested by the user 202. Furthermore, when a user 202 is unable to reach the mobile computing device 204, an ability of the mobile computing device 204 to navigate to the user 202 and provide a response can eliminate a need for the user 202 to stop what they are doing in certain circumstances.

Figure 3:
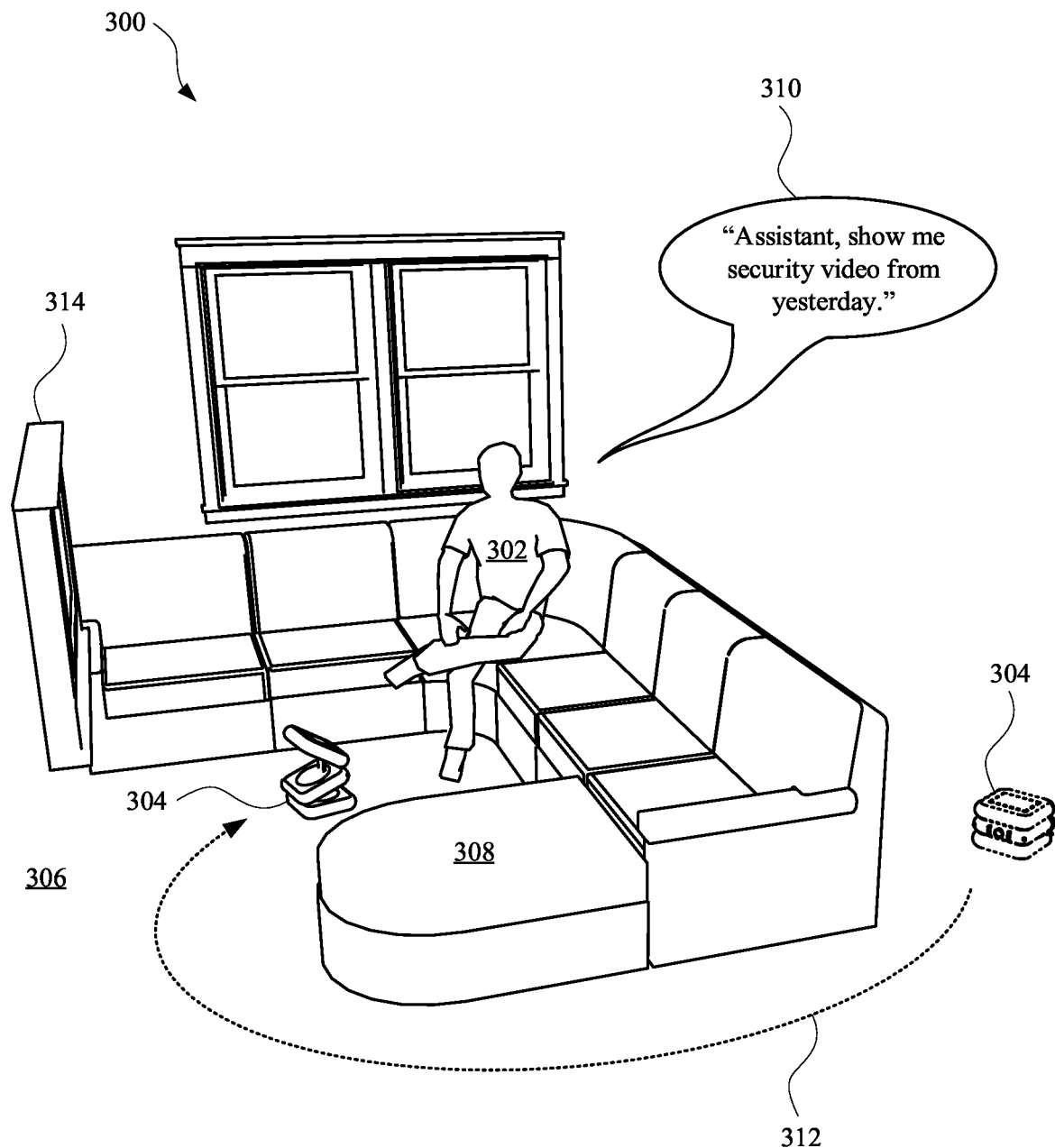
FIG. 3 illustrates a view of a user providing a spoken utterance that causes a mobile computing device to navigate to the user, and arrange different housing enclosures of the mobile computing device in order to protect graphical content towards the user.

FIG. 3 illustrates a view 300 of a user 302 providing a spoken utterance 310 that causes a mobile computing device 304 to navigate to the user 302, and arrange different housing enclosures of the mobile computing device 304 in order to protect graphical content towards the user 302. The mobile computing device 304 can selectively navigate to the user 302 according to whether the user 302 is requesting that a particular type of content be provided to the user 302. For example, as provided in FIG. 2, a mobile computing device 204 can bypass navigating to the user 202 when the user has requested audio content and the mobile computing device 204 has determined that the user 202 is within a threshold distance for audibly rendering audio content for the user 202. However, when the user requests graphical content, such as in FIG. 3, the mobile computing device 304 can navigate to the user 302 in order to present the graphical content at a display panel of the mobile computing device 304.

For instance, as provided in FIG. 3, the user 302 can provide a spoken utterance 310 such as, "Assistant, show me security video from yesterday." In response to receiving the spoken utterance 310, the mobile computing device 304 can generate audio data characterizing the spoken utterance and process the audio data at the mobile computing device 304 and/or transmit the audio data to another computing device for processing. Based on the processing of the audio data, the mobile computing device 304 can determine that the user 302 is requesting that the mobile computing device 304, and/or any other display-enabled device, provide playback of a security video for the user 302. Based on this determination, the mobile computing device 304 can determine a location of the user 302 relative to the mobile computing device 304. Additionally, or optionally, the mobile computing device 304 can identify one or more obstacles present in a room 306 that the mobile computing device 304 well navigate to in order to reach the user 302. For example, using image data captured via a camera of the mobile computing device 304 can determine that a couch 308 is separating the user 302 from the mobile computing device 304. Using this image data, the mobile computing device 304, and/or a remote computing device that processes the image data, can generate a route 312 for reaching the user 302.

In some implementations, the mobile computing device 304 can be connected to a local network that other computing devices are connected to. When the mobile computing device 304 determines that the mobile computing device 304 cannot navigate to the user 302 because of one or more obstacles, and/or cannot navigate to the user within a threshold amount of time, an automated assistant accessible via the mobile computing device 304 can identify other display enabled devices that are connected over the local area network. For example, the automated assistant can determine that a television 314 is located in the same room as the user 302 and also determine that the mobile computing device 304 cannot reach the user. Based on these determinations, the automated assistant can cause the requested display content to be rendered at the television 314 and/or any other computing device that is located within the room 306 and is display enabled.

However, when the mobile computing device 304 is able to navigate to the route 312 to reach the user 302, the mobile computing device 304 can identify one or more anatomical features of the user 302 when it reaches the user 302 and/or when the mobile computing device 304 is on the way to a location of the user 302. For example, as the mobile computing device 304 is navigating the route 312 to reach the user 302, the mobile computing device 304 can determine that the user 302 is within a viewing window of the camera of the mobile computing device 304. In response to this determination, the mobile computing device 304 can use image data captured via the camera in order to identify the eyes, the mouth, and/or the ears of the user 302. Based on identifying one or more of these anatomical features of the user 302, the mobile computing device 304 can cause one or more motors of the mobile computing device 304 to maneuver the display panel of the mobile computing device 304 toward a direction of the user 302.

For example, when the display panel is connected to a first housing enclosure of the mobile computing device 304, one or more first motors of the mobile computing device 304 can cause an angle of separation between the first housing enclosure and the second housing enclosure to increase. Furthermore, based on a determined location of the anatomical features of the user 302 relative to the mobile computing device 304, one or more motors of the mobile computing device 304 can further increase a height of the mobile computing device 304, such that the display panel is more readily viewable by the user 302. For example, one or more second motors of the mobile computing device 304 can cause a second housing enclosure of the mobile computing device 304 to have an increased angle of separation with respect to a third housing enclosure of the mobile computing device 304. Increases in these angles of separation can cause the mobile computing device 304 to transformer from being in a compressed state to being in an expanded state, thereby increasing the height of the mobile computing device 304. When the mobile computing device 304 has completed rendering the graphical content per the spoken utterance 310, the mobile computing device 304 can return to a collapsed state in order to reserve stored energy of the rechargeable power source of the mobile computing device 304.

Figure 4:
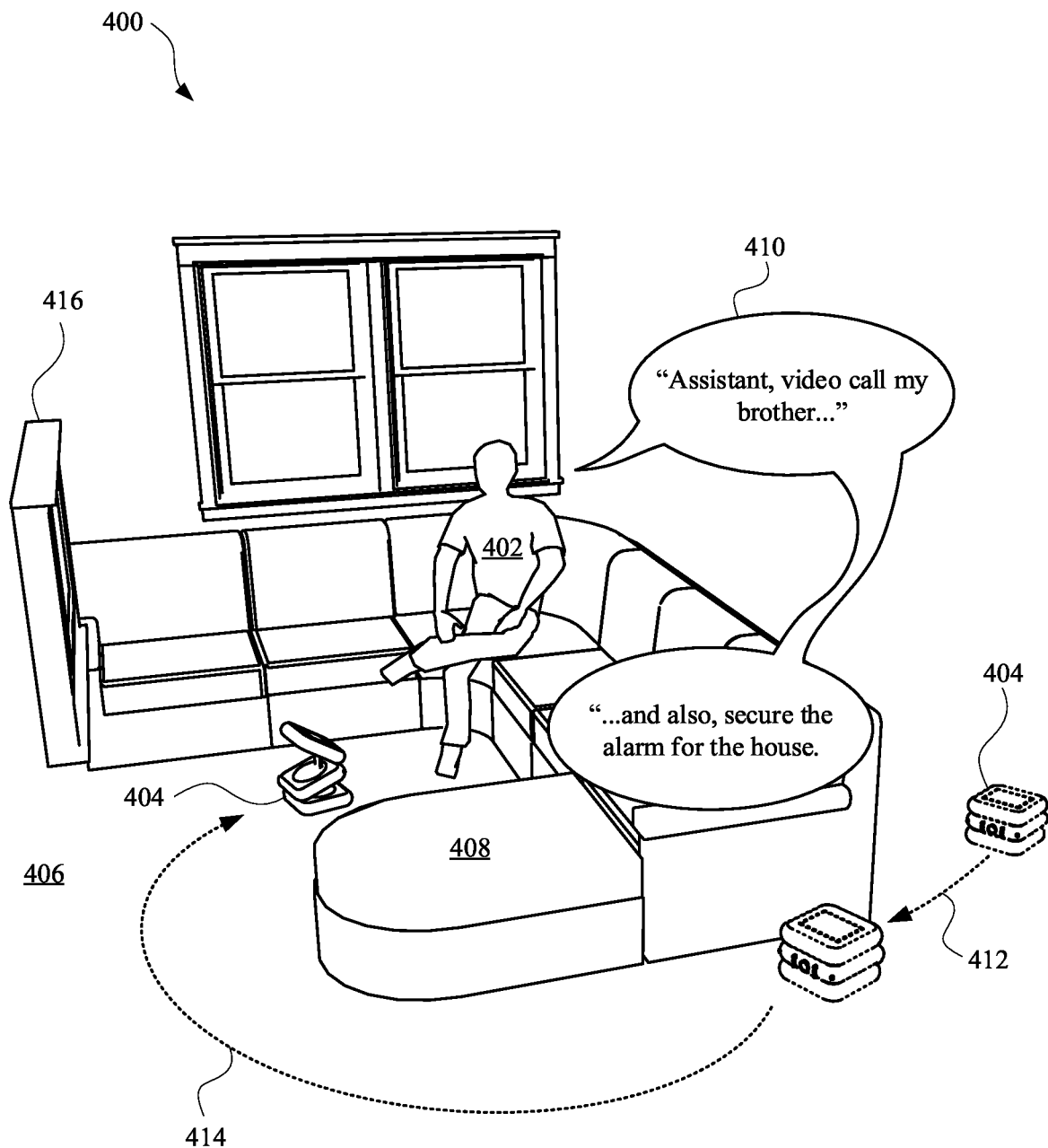
FIG. 4 illustrates a view of a user providing a spoken utterance to a mobile computing device, which can intermittently pause during navigation in order to capture any additional spoken utterances from the user.

FIG. 4 illustrates a view 400 of a user 402 providing a spoken utterance to a mobile computing device 404, which can intermittently pause during navigation in order to capture any additional spoken utterances from the user 402. The mobile computing device 404 can and provide access to an automated assistant, which can be responsive to a variety of different inputs from one or more users. The user 402 can provide spoken utterances, which can be processed at the mobile computing device 404 and/or another computing device that is associated with the mobile computing device 404. The mobile computing device 404 can include one or more microphones, which can provide an output signal in response to a spoken input from the user. In order to eliminate noise that might otherwise affect spoken inputs, the mobile computing device 404 can determine whether the user 402 is providing a spoken input when one or more motors of the mobile computing device 404 are operating. In response to determining that a spoken utterance is being provided while the one or more motors are operating, the mobile computing device 404 can cause the one or more motors to enter a lower-power state in order to reduce an amount of noise being generated by the one or more motors.

For example, the user 402 can provide a spoken utterance 410 such as, "assistant, video call my brother . . . " and the mobile computing device 404 can receive the spoken utterance 410, and determine that the spoken utterance 410 corresponds to an action that involves the camera and/or rendering graphical content. In response to determining that the action involves the camera of the mobile computing device 404 and rendering graphical content, the mobile computing device 404 can navigate toward a location of the user 402. As the mobile computing device 404 traverses a first portion 412 of the route, the user 402 can provide a subsequent spoken utterance 410 such as, " . . . . And also, secure the alarm for the house." While traversing the first portion 412 of the route, the mobile computing device 404 can determine that the user 402 is providing the subsequent spoken utterance. In response, the mobile computing device 404 can cause one or more motors of the mobile computing device 404 to enter a lower-power state relative to a power state that the one or more motors were operating in when the mobile computing device 404 was traversing the first portion 412 of the route. For example, the one or more motors can pause their respective operations, thereby causing the mobile computing device 404 to pause after the first portion 412 of the route for the user 402.

Mobile computing device 404 and/or the automated assistant determine that the subsequently spoken utterance has completed and/or is otherwise no longer being directed at the mobile computing device 404, the mobile computing device 404 can proceed to traversing a second portion 414 of the route toward the location of the user 402. The second portion 414 of the route can include navigating through a room 406 that includes a couch 408 and/or other obstacle. The mobile computing device 404 can use the camera to identify such obstacles, as well as the user 402, with prior permission from the user. In some implementations, wow the mobile computing device 404 is traversing the second portion of the route 414, the automated assistant can initialize performance of the other action requested by the user 402. Specifically, while the mobile computing device 404 is traversing the second portion 414 of the route toward the location of the user 402, the mobile computing device 404 can initialize securing the alarm for the house. This action can be initialized based on determining and that the action does not involve rendering graphical content that the user would want to see, and/or does not involve rendering audio data that the mobile computing device 404 what attempted to render at a distance that would allow the audio content to be audible to the user 402.

Figure 5:
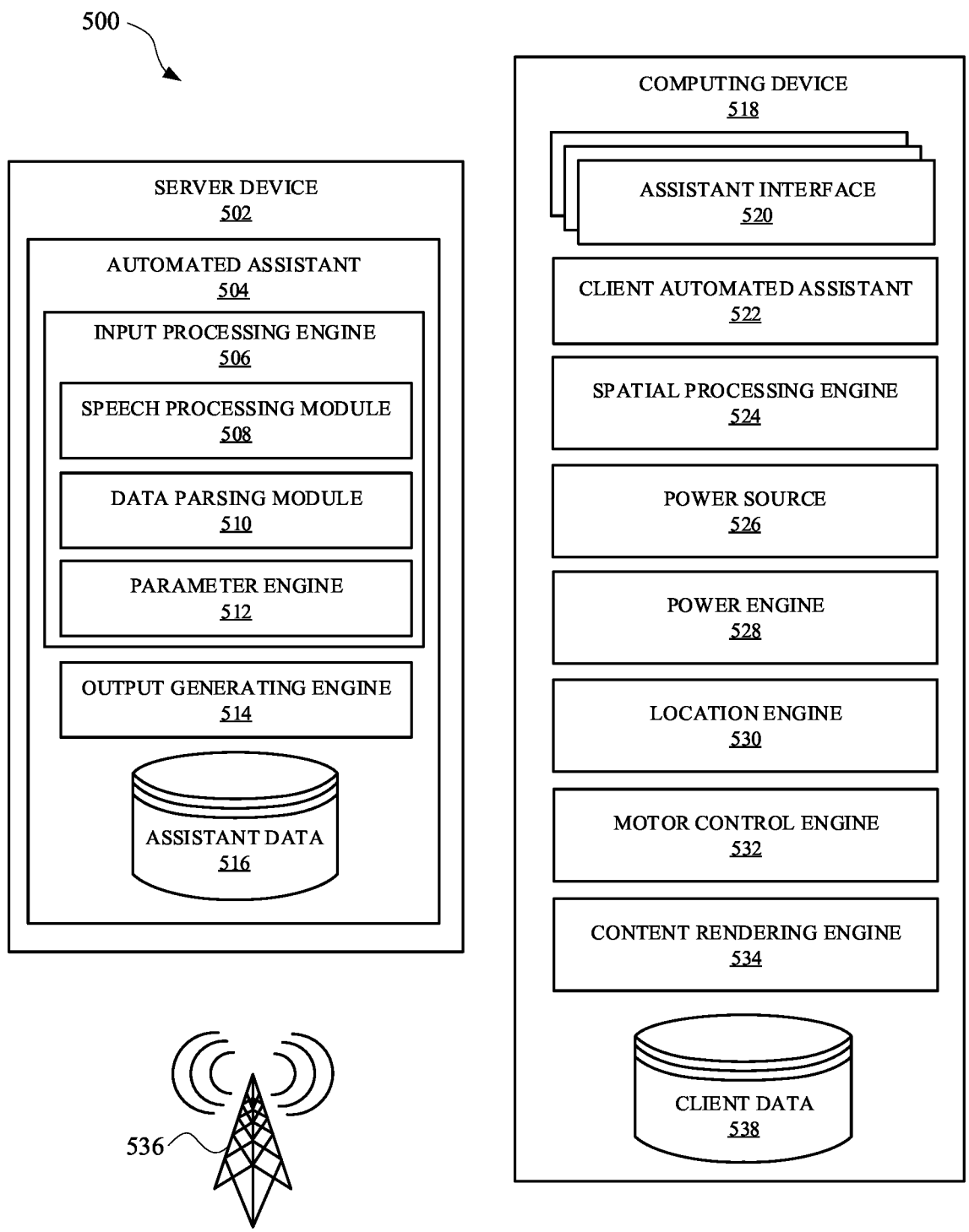
FIG. 5 further illustrates a system for operating a computing device that provides access to the automated assistant, and autonomously moves toward and/or away from a user in response to spoken utterances.

FIG. 5 illustrates a system 500 for operating a computing device 518 to selectively navigate to a user for rendering certain content to a user, and toggles motor operations according to whether the user is providing a spoken utterance to the computing device 518. The automated assistant 504 can operate as part of an assistant application that is provided at one or more computing devices, such as a computing device 518 and/or a server device 502. A user can interact with the automated assistant 504 via an assistant interface, which can be a microphone, a camera, a touch screen display, a user interface, and/or any other apparatus capable of providing an interface between a user and an application.

For instance, a user can initialize the automated assistant 504 by providing a verbal, textual, and/or a graphical input to the assistant interface to cause the automated assistant 504 to perform a function (e.g., provide data, control a peripheral device, access an agent, generate an input and/or an output, etc.). The computing device 518 can include a display device, which can be a display panel that includes a touch interface for receiving touch inputs and/or gestures for allowing a user to control applications of the computing device 518 via the touch interface. In some implementations, computing device 518 can lack a display device, thereby providing an audible user interface output, without providing a graphical user interface output. Furthermore, the computing device 518 can provide a user interface, such as a microphone, for receiving spoken natural language inputs from a user. In some implementations, the computing device 518 can include a touch interface and can be void of a camera, but can optionally include one or more other sensors.

The computing device 518 and/or other computing devices can be in communication with the server device 502 over a network 536, such as the internet. Additionally, the computing device 518 and the other computing devices can be in communication with each other over a local area network (LAN), such as a WiFi network. The computing device 518 can offload computational tasks to the server device 502 in order to conserve computational resources at the computing device 518. For instance, the server device 502 can host the automated assistant 504, and computing device 518 can transmit inputs received at one or more assistant interfaces 420 to the server device 502. However, in some implementations, the automated assistant 504 can be hosted at the computing device 518 as a client automated assistant 522.

In various implementations, all or less than all aspects of the automated assistant 504 can be implemented on the computing device 518. In some of those implementations, aspects of the automated assistant 504 are implemented via the client automated assistant 522 of the computing device 518 and interface with the server device 502 that implements other aspects of the automated assistant 504. The server device 502 can optionally serve a plurality of users and their associated assistant applications via multiple threads. In implementations where all or less than all aspects of the automated assistant 504 are implemented via a client automated assistant 522 at the computing device 518, the client automated assistant 522 can be an application that is separate from an operating system of the computing device 518 (e.g., installed "on top" of the operating system)—or can alternatively be implemented directly by the operating system of the computing device 518 (e.g., considered an application of, but integral with, the operating system).

In some implementations, the automated assistant 504 and/or the client automated assistant 522 can include an input processing engine 506, which can employ multiple different modules for processing inputs and/or outputs for the computing device 518 and/or the server device 502. For instance, the input processing engine 506 can include a speech processing module 508 that can process audio data received at an assistant interface 420 to identify the text embodied in the audio data. The audio data can be transmitted from, for example, the computing device 518 to the server device 502 in order to preserve computational resources at the computing device 518.

The process for converting the audio data to text can include a speech recognition algorithm, which can employ neural networks, and/or statistical models for identifying groups of audio data corresponding to words or phrases. The text converted from the audio data can be parsed by a data parsing module 510 and made available to the automated assistant as textual data that can be used to generate and/or identify command phrases from the user. In some implementations, output data provided by the data parsing module 510 can be provided to a parameter module 512 to determine whether the user provided an input that corresponds to a particular action and/or routine capable of being performed by the automated assistant 504 and/or an application or agent that is capable of being accessed by the automated assistant 504. For example, assistant data 516 can be stored at the server device 502 and/or the computing device 518, as client data 538, and can include data that defines one or more actions capable of being performed by the automated assistant 504 and/or client automated assistant 522, as well as parameters necessary to perform the actions.

FIG. 5 further illustrates a system 500 for operating a computing device 518 that provides access to the automated assistant 504, and autonomously moves toward and/or away from a user in response to spoken utterances. The computing device 518 can be powered by one or more power sources 526, which can be rechargeable and/or can allow the computing device 518 to be portable. A motor control engine 532 can powered by the power source 526 and determine when to control one or more motors of the computing device 518. For example, the motor control engine 532 can determine one or more operating status is of the computing device 518 and control one or more motors of the computing device 518 to reflect the one or more operating statuses. For instance, when the computing device 518 has received a spoken utterance at an assistant interface 520 of the computing device 518, the motor control engine 532 can determine that the user is providing the spoken utterance, and cause the one or more motors to operate in furtherance of indicating that the computing device 518 is acknowledging the spoken utterance. The one or more motors can, for example, cause the computing device 518 to shake and/or dance when receiving the spoken utterance. Alternatively, or additionally, the motor control engine 532 can cause the one or more motors to maneuver the computing device 518 back and forth, via ground wheels of the computing device 518, to indicate that the computing device 518 is downloading and/or uploading data over a network. Alternatively, or additionally, the motor control engine 532 can cause the one or more motors to arrange housing enclosures of the computing device 518 to be in a compressed or relaxed state, indicating that the computing device 518 is operating in a low-power mode and/or a sleep mode.

When operating in the sleep mode, the computing device 518 can monitor for an invocation phrase being spoken by the user, and/or can perform voice activity detection. When the computing device is performing voice activity detection, the computing device 518 can determine whether inputs to the microphone correspond to human. Furthermore, voice activity detection can be performed when the computing device 518 is being controlled by one or more motors of the computing device 518. In some implementations, thresholds for determining whether human speech has been detected can include a threshold for when one or more motors are operating, and another threshold for when the one or more motors are not operating. For example, when the computing device 518 is in the sleep mode, voice activity detection can be performed according to a first threshold, we can be satisfied when a first percentage of incoming noise corresponds to human speech. However when the computing device 518 is an awake mode, the voice activity detection can be performed according to a second threshold, which can be satisfied when a second percentage of incoming noise corresponds to human speech, and the second percentage of incoming noise is higher than the first percentage of incoming noise. Furthermore, when the computing device 518 is in the wake mode and the one or more motors are operating to rearrange the computing device 518, and/or navigate the computing device 518, voice activity detection can be performed according to a third price hold, which can be satisfied when a third percentage of incoming noise corresponds to human speech. The third percentage of incoming ways can greater than and/or equal to the second percentage of incoming noise, and/or the first percentage of incoming noise.

In some implementations, in response to the computing device 518 determining that human speech has been detected, a spatial processing engine 524 in process incoming data from one or more sensors to determine where the human speech is coming from. Spatial data characterizing the location of the source of the human speech, such as a user, can be generated by the spatial processing engine 524 and communicated to a location engine 530. The location engine 530 can use the spatial data to generate a route for navigating the computing device 518 from my current location at the computing device 518 to the location of the source of the human speech. Route data can be generated by the location engine 530 and communicated to the motor control engine 532. The motor control engine 532 can use the route data to control one or more motors of the computing device 518 for navigating to the location of the user and/or source of human speech.

In some implementations, the spatial processing engine 524 can process incoming data from one or more sensors of the computing device 518 to determine whether the computing device 518 is located within a distance from the source of the human speech for rendering audible audio. For example, the automated assistant can receive a request from the user and can determine one or more actions being requested by the user. The one or more actions can be communicated to a content rendering engine 534, which can determine whether the user is requesting audio content to be rendered, graphic content to be rendered, and/or either audio or graphical content to be rendered. In response to determining that the user has requested audio content to be rendered, the spatial processing engine 524 can determine whether the computing device 518 is located within a distance from the user for generating audio content that would be audible to the user. When the computing device 518 determines that the computing device 518 is not within the distance for generating audible content, the computing device 518 can control one or more motors in order to navigate the computing device 518 to be within the distance for generating audible content.

Alternatively, in response to determining that the user has requested a graphical content to be rendered, the spatial processing engine 524 can determine whether the computing device 518 is located within another distance from the user for generating graphical content that would be visible to the user. When the computing device 518 determines that the computing device 518 is not within the other distance for generating visible graphical content, the computing device 518 can control one or more motors in order to navigate the computing device 518 to be within the other distance for generating visible graphical content. In some implementations, an amount of distance between the user and the computing device 518, when the computing device 518 is rendering graphical content, can be based on specific properties of the graphical content. For example, when the graphical content includes text that is X size, the computing device 518 to navigate to be within m distance from the user. However, when the graphical content includes text that is Y size, which is less than X size, the computing device 518 can navigate to be within N distance from the user, where and is less than M. Alternatively, or additionally, the distance between the user and the computing device 518 can be based on the type of content to be generated. For example, the computing device 518 can navigate to H distance from the user when the graphical content to be rendered includes video content, and can navigate to K distance from the user when the graphical content to be rendered includes a static image, where H is less than K.

Figure 6:
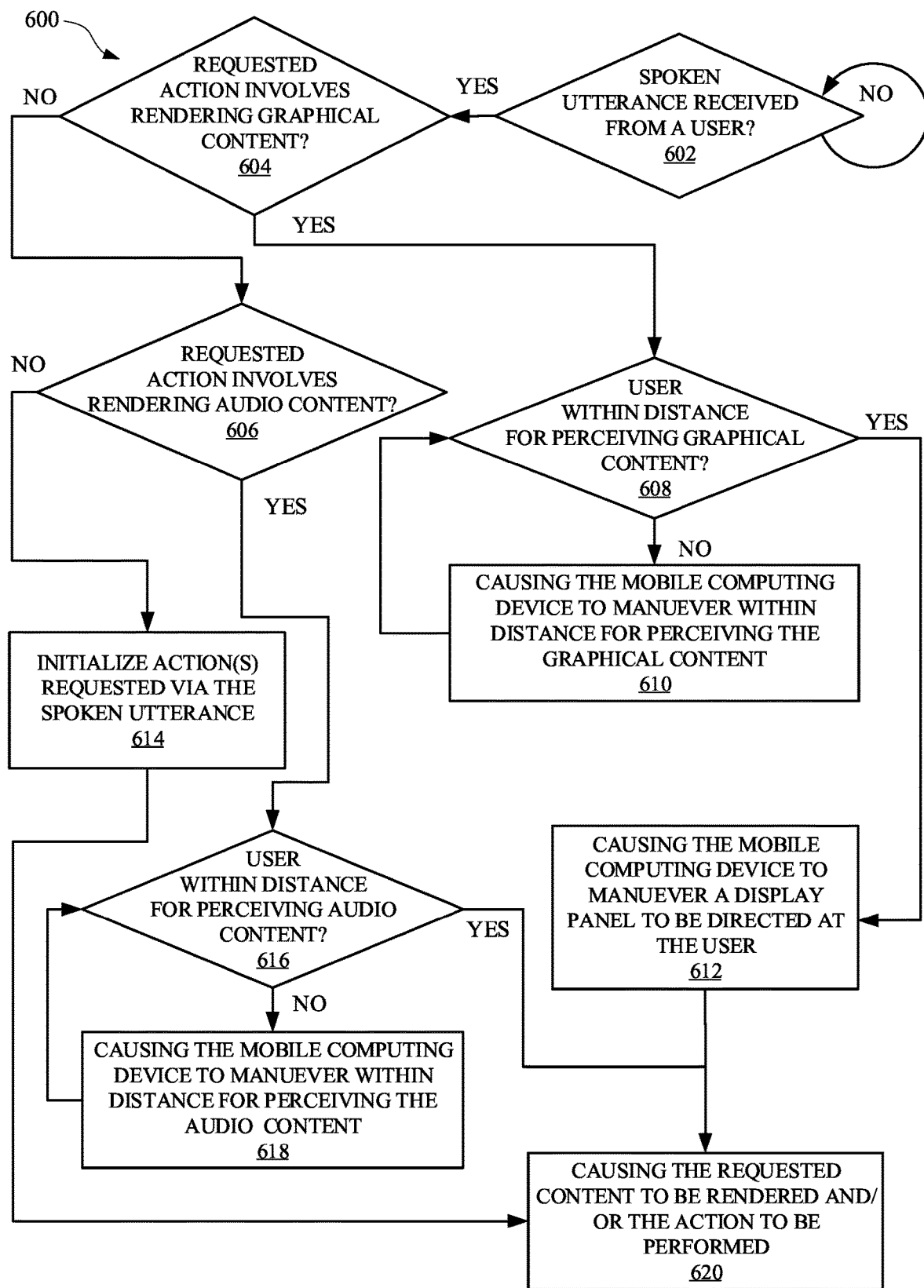
FIG. 6 illustrates a method for rendering content at a mobile computing device that selectively and autonomously navigates to a user in response to a spoken utterance.

FIG. 6 illustrates a method 600 for rendering content at a mobile computing device that selectively and autonomously navigates to a user in response to a spoken utterance. The method 600 can be performed by one or more computing devices, applications, and/or any other apparatus or module capable of being responsive to spoken utterances. The method 600 can include an operation 602 of determining whether a spoken utterance has been received from a user. The mobile computing device can include one or more microphones with which the mobile computing device can detect spoken inputs from the user. Furthermore, the mobile computing device can provide access to an automated assistant, which can initialize actions and/or render content in response to the user of providing one or more inputs. For example, the user can provide a spoken utterance such as, "Assistant, send a video message to Megan." The mobile computing device can generate audio data based on the spoken utterance and cause the audio data to be processed in order to identify one or more actions (e.g., initializing a video call to a contact) being requested by the user.

When a spoken utterance has not been detected at the mobile computing device, one or more microphones of the mobile computing device can be monitored for spoken inputs. However, when a spoken utterance is received, the method 600 can proceed from the operation 602 to the operation 604. The operation 604 can include determining whether the requested action involves rendering graphical content. The graphical content can be, but is not limited to, media provided by an application, streaming data, video recorded by a camera accessible to the user, and/or any other video data that may or may not be associated with corresponding audio data. For example, when the user requests that a video message be provided to another person, the mobile computing device can determine that the requested action does involve rendering graphical content, because generating the video message can involve rendering a video preview of the video message and rendering a video stream of the recipient (e.g., "Megan").

When the requested action is determined to involve rendering graphical content, the method 600 can proceed from the operation 604 to the operation 608. The operation 608 can include determining whether the user is within a distance, or at a distance, for perceiving graphical content. That is, the operation may determine whether the location of the user relative to the mobile computing device satisfies a distance condition. The distance condition may be predetermined and may, for example, be fixed for all graphical content. Alternatively, the distance condition may vary in dependence on the particular graphical content (i.e., the distance condition may be determined based on the graphical content). For example, a display of basic content, which may be displayed in a large font, may be associated with a different distance condition compared to the displaying of detailed or densely presented content. In other words, the mobile computing device, and/or a server that is in communication with the mobile computing device, can process data to determine whether the user is able to perceive graphical content that would be displayed at the mobile computing device. For example, the mobile computing device can include a camera that captures image data, which can characterize a location of the user relative to the mobile computing device. The mobile computing device can determine, using the image data, a proximity of the user relative to the mobile computing device, and thereby determine whether the user can reasonably see the display panel of the mobile computing device. When the mobile computing device determines that the user is not within the distance for perceiving the graphical content (i.e., that a distance condition associated with the content is satisfied), the method 600 can proceed to the operation 610.

The operation 610 concluded causing the mobile computing device to maneuver within distance for perceiving the graphical content. In other words, the mobile computing device can operate one or more motors in order to navigate the mobile computing device toward the user, at least until the mobile computing device reaches or comes within the distance for the user to perceive the graphical content. When the user is determined is to be within the distance for perceiving (e.g., being able to see and/or read) the graphical content, the method 600 can proceed from the operation 608 to the operation 612.

When the requested action is determined to not involve rendering graphical content, the method 600 can proceed from the operation 604 to the operation 606. The operation 606 can include determining whether the requested action involves rendering audio content. Audio content can include any output from the mobile computing device and/or any other computing device that can be audible to one or more users. When the requested action is determined to involve rendering audio content, the method 600 can proceed from the operation at 606 to the operation 616. Otherwise, when the requested action is determined to not involve rendering audio content and/or graphical content, the method 600 can proceed to the operation 614, in which one or more requested actions are initialized in response to the spoken utterance.

The operation 616 can include determining whether the user is within a distance for perceiving audio content. In other words, the mobile computing device can determine whether a current location of the user would allow the user to hear audio that is generated at the mobile computing device or another computing device that can render audio content in response to the spoken utterance. For example, the mobile computing device can generate audio data and/or image data from which a location of the user, relative to the mobile computing device, can be estimated. When an estimated distance of the user from the mobile computing device is not within the distance for perceiving audio content, the method 600 can proceed from the operation 616 to the operation 618.

The operation 618 can include causing the mobile computing device to maneuver within the distance for perceiving the audio content. Alternatively, or additionally, the operation 618 can include determining whether one or more other computing devices are within a distance from the user for rendering audio content. Therefore, if another computing device is located within a distance for rendering audible audio content for the user, the determination at operation 616 can be positively satisfied and the method 600 can proceed to the operation 620. Otherwise, the mobile computing device can maneuver closer to the user in order that the mobile computing device will be within the distance for the user to perceive audio content generated by the mobile computing device. When the mobile computing device is within the distance for the user to receive audio content, the method 600 can proceed from the operation 616 to the operation 620.

In instances where the requested action involves graphical content, and the mobile computing device has maneuvered to within the distance for the user to perceive the graphical content, the method 600 can proceed from the operation 608 to the operation 612. The operation 612 can include causing the mobile computing device to maneuver a display panel to be directed at the user. The display panel can be controlled by one or more motors that are attached to one or more housing enclosures of the mobile computing device. For example, one or more motors can be attached to a first housing enclosure, and can operate to adjust an angle of the display panel. Image data and/or audio data captured at the mobile computing device, and/or any other computing device with permission from the user, can be processed to identify one or more anatomical features of the user, such as the eyes of the user. Based on identifying the anatomical feature, the one or more motors that control the angle of the display panel can be operated to maneuver the display panel such that the display panel projects the graphical content towards the anatomical feature of the user. In some implementations, one or more other motors of the mobile computing device can further adjust a height of the display panel of the mobile computing device. Therefore, the one or more motors and/or the one or more other motors can operate simultaneously to maneuver the display panel to be within a field of view of the user and/or be directed at the anatomical feature of the user.

When the mobile computing device has completed maneuvering the display panel to be directed at the user, the method 600 can proceed from the operation at 612 to the operation 620. The operation 620 can include causing the requested content to be rendered and/or causing the requested action to be performed. For example, when the user provides the spoken utterance requesting that the automated assistant to turn on the lights in the house, this action can involve controlling an IoT device without rendering audio content and/or display content, thereby allowing the mobile computing device to bypass maneuvering toward the direction of the user. However, when a spoken utterance includes a request for an audio stream and/or a video stream to be provided via the mobile computing device, the mobile computing device can maneuver toward the user and/or confirm that the user is within the distance for perceiving the content. Thereafter, the mobile computing device can then render the content for the user. In this way, delays that might otherwise be caused by having the user first request that the mobile computing device navigate to the user, prior to rendering the content. Furthermore, the mobile computing device can preserve computational resources by selecting whether to navigate to the user or not, depending on the type of content to be rendered for the user. Such computational resources, such as power and processing bandwidth, might otherwise be wasted if the mobile computing device indiscriminately navigated toward the user without regard for the action(s) being requested.

Figure 7:
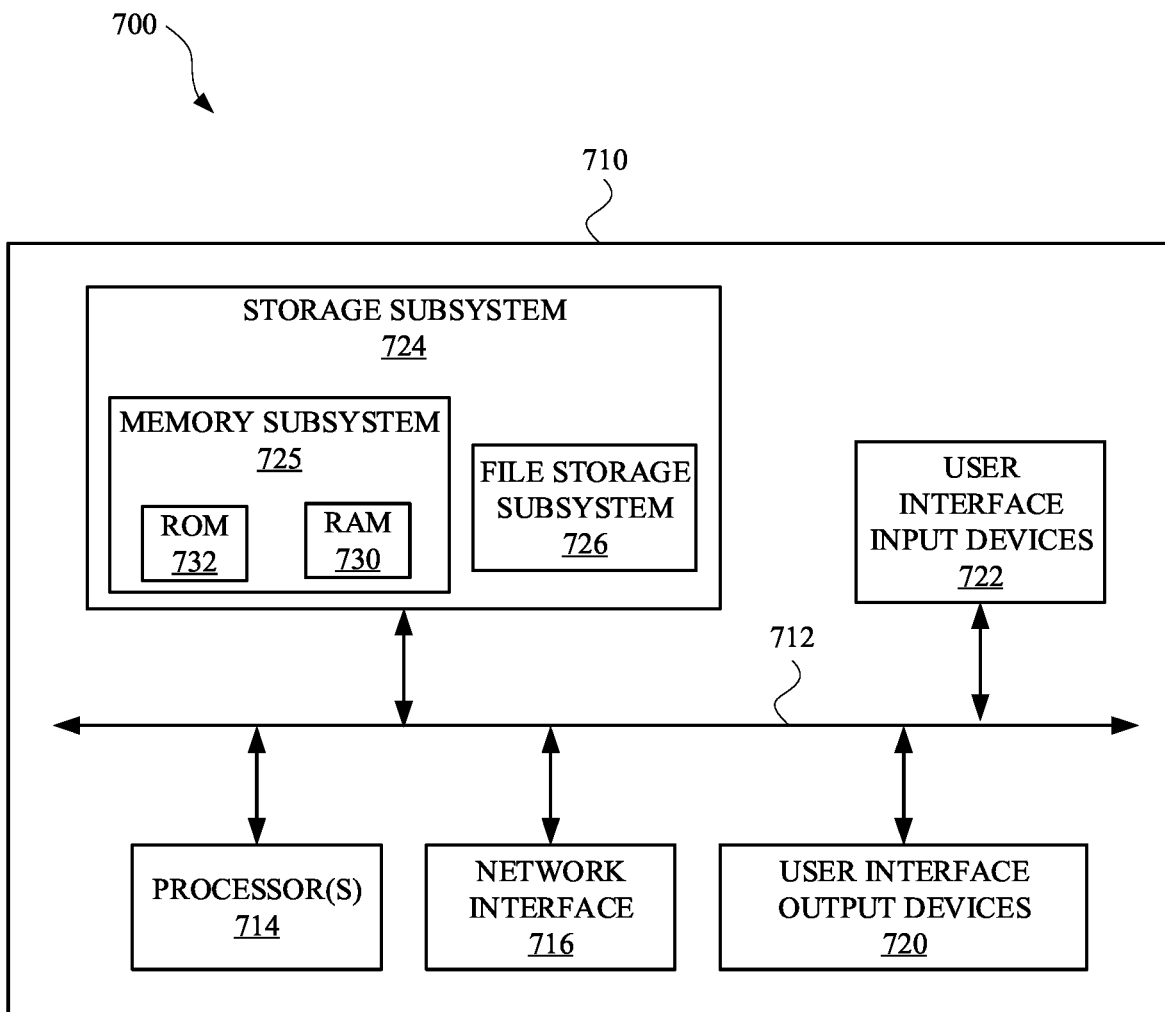
FIG. 7 illustrates a block diagram of an example computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 600, and/or to implement one or more of system 500, mobile computing device 102, mobile computing device 204, mobile computing device 304, mobile computing device 404, automated assistant, computing device 518, server device 502, and/or any other application, device, apparatus, and/or module discussed herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used.

Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method is set forth as including operations such as determining, based on input to one or more microphones of a mobile computing device, that a user has provided a spoken utterance, wherein the mobile computing device includes one or more first motors that maneuver the mobile computing device across an area. The method can further include determining, based on the input to the one or more microphones, that the user is requesting the mobile computing device to perform an action that is associated with an automated assistant rendering content via one or more speakers and/or a display panel of the mobile computing device. The method can further include determining, based on the input to the one or more microphones, an additional input to the one or more microphones, and/or one or more other sensors of the mobile computing device, a location of the user relative to the mobile computing device. The method can further include, when the content requested by the user to be rendered at the mobile computing device includes graphical content and when the determined location satisfies a particular distance condition: causing the first motor of the mobile computing device to maneuver the mobile computing device toward the location of the user, and causing the display panel to render the graphical content in furtherance of performing the action.

In some implementations, the method can further include, when the content requested by the user to be rendered at the mobile computing device includes audio content: determining whether the mobile computing device is within a distance from the user for audibly rendering the audio content for the user. The method can further include, when the mobile computing device is not within the distance from the user for audibly rendering the audio content for the user: causing, based on determining that the mobile computing device is not within the distance from the user, the one or more first motors of the mobile computing device to maneuver the mobile computing device toward the location of the user, and causing one or more speakers of the mobile computing device to render the audio content in furtherance of performing the action.

In some implementations, the method can further include, when the content requested by the user to be rendered at the mobile computing device includes the graphical content and when the determined location satisfies the distance condition: causing one or more one or more second motors of the mobile computing device to maneuver the display panel of the mobile computing device in furtherance of rendering the graphical content toward the user. In some implementations, the method can further include determining whether the user is providing a subsequent spoken utterance when the one or more first motors and/or the one or more second motors of the mobile computing device are operating: and when the subsequent spoken utterance is being received while the one or more first motors and/or the one or more second motors of the mobile computing device are operating: causing the one or more first motors and/or the one or more second motors to transition into a reduced power state, wherein the reduced power state corresponds to a state in which the one or more first motors and/or the one or more second motors consume less power than another state and/or a previous state of the one or more first motors and/or the one or more second motors.

In some implementations, the method can further include, when the subsequent spoken utterance is no longer being received while the one or more first motors and/or the one or more second motors of the mobile computing device are operating: causing the one or more first motors and/or the one or more second motors to transition from the reduced power state into the other operating state in furtherance of maneuvering the display panel and/or maneuvering the mobile computing device toward the location of the user. In some implementations, the method can further include identifying, in response to receiving the input to the microphone and using a camera of the mobile computing device, an anatomical feature of the user, wherein causing the one or more second motors to maneuver the display panel includes causing the display panel to be directed at the anatomical feature of the user. In some implementations, the method can further include, when the content requested by the user to be rendered at the mobile computing device corresponds to graphical content and/or audio content: causing, based on the content requested by the user corresponding to graphical content and/or audio content, one or more third motors of the mobile computing device to maneuver a camera of the mobile computing device to be directed toward the user.

In some implementations, the display panel is mounted to a first housing enclosure of the mobile computing device, the camera is mounted to a second housing enclosure of the mobile computing device, and the one or more third motors are at least partially enclosed within a third housing enclosure of the mobile computing device. In some implementations, causing the one or more third motors of the mobile computing device to maneuver the camera of the mobile computing device in a direction of the user includes: causing the second housing enclosure of the mobile computing device to rotate about an axis that intersects the third housing enclosure of the mobile computing device. In some implementations, a fourth motor is at least partially enclosed in the second housing enclosure and controls a radial motion of the second housing enclosure with respect to the third housing enclosure, and the method further comprises: when the content requested by the user to be rendered at the mobile computing device corresponds to graphical content and/or audio content: causing the fourth motor to effectuate the radial motion of the second housing enclosure such that the second housing enclosure changes an angle of separation with the third housing enclosure.

In some implementations, the method can further include, when the content requested by the user to be rendered at the mobile computing device corresponds to graphical content and/or audio content: identifying, in response to receiving the input to the microphone and using the camera of the mobile computing device, an anatomical feature of the user, and determining, based on identifying the anatomical feature of the user, the angle of separation of the second housing enclosure with respect to the third housing enclosure, wherein the angle of separation corresponds to an angle in which the camera is directed at the anatomical feature of the user. In some implementations, a fifth motor is at least partially enclosed in the first housing enclosure and controls another radial motion of the first housing enclosure with respect to the second housing enclosure, and the method further comprises: when the content requested by the user to be rendered at the mobile computing device corresponds to graphical content and/or audio content: causing the fifth motor to effectuate the other radial motion of the first housing enclosure such that the first housing enclosure reaches another angle of separation with the second housing enclosure.

In some implementations, the method can further include, when the content requested by the user to be rendered at the mobile computing device corresponds to graphical content and/or audio content: identifying, in response to receiving the input to the microphone and using the camera of the mobile computing device, an anatomical feature of the user, and determining, based on identifying the anatomical feature of the user, the other angle of separation of the first housing enclosure with respect to the second housing enclosure, wherein the other angle of separation corresponds to another angle in which the display panel is directed at the anatomical feature of the user. In some implementations, determining the location of the user relative to the mobile computing device includes: determining, using output from multiple microphones of the mobile computing device, that the location includes multiple different persons, and determining, using other output from a camera of the mobile computing device, that the user is one of the persons of the multiple different persons. In some implementations, the method can further include causing, subsequent to rendering the display content and/or the audio content, the one or more second motors to reduce a height of the mobile computing device by maneuvering a first housing enclosure and the display panel of the mobile computing device toward a second housing enclosure of the mobile computing device.

In other implementations, a method is set forth as including operations such as determining, based on an input to one or more microphones of a mobile computing device, that a user has provided a spoken utterance to the mobile computing device. The method can further include causing, in response to the spoken utterance being provided to the mobile computing device, one or more motors of the mobile computing device to maneuver a display panel, which is attached to a first housing enclosure of the mobile computing device, away from a second housing enclosure of the mobile computing device. The method can further include determining, while the one or more motors are maneuvering the first housing enclosure away from the second housing enclosure, whether another spoken utterance is being directed at the mobile computing device. The method can further include, when the other spoken utterance is determined to be directed at the mobile computing device: causing the one or more motors to transition into a lower power state while the other spoken utterance is being directed at the mobile computing device, causing an automated assistant, which is accessible via the mobile computing device, to initialize performance of an action based on the other spoken utterance. The method can further include, when the other spoken utterance is complete and/or no longer being directed at the mobile computing device: causing the one or more motors to complete maneuvering the first enclosure away from the second housing enclosure.

In some implementations, the method can further include causing, in response to the spoken utterance being provided to the mobile computing device, one or more second motors of the mobile computing device to drive the mobile computing device toward a location of the user. In some implementations, the method can further include, when the other spoken utterance is determined to be directed at the mobile computing device: causing the one or more second motors of the mobile computing device to pause driving the mobile computing device toward the location of the user, and when the other spoken utterance is complete and/or no longer being directed at the mobile computing device: causing the one or more second motors of the mobile computing device to continue driving the mobile computing device toward the location of the user.

In some implementations, the method can further include, when the one or more second motors have completed driving the mobile computing device toward the location of the user: causing, based on the spoken utterance and/or the other spoken utterance, one or more third motors of the mobile computing device to maneuver the second housing enclosure away from a third housing enclosure of the mobile computing device, and maneuver a camera of the mobile computing device toward the user. In some implementations, the method can further include, when the one or more second motors have completed driving the mobile computing device toward the location of the user: causing, based on the spoken utterance and/or the other spoken utterance, one or more fourth motors to rotate the first housing enclosure about an axis that intersects a surface of a third housing enclosure in furtherance of directing the display panel at the user.

In yet other implementations, a method is set forth as including operations such as determining, based on an input to one or more microphones of a mobile computing device, that a user has provided a spoken utterance to the mobile computing device. The method can further include causing, in response to the spoken utterance being provided to the mobile computing device, one or more motors of the mobile computing device to maneuver the mobile computing device toward a location of the user. The method can further include determining, while the one or more motors are maneuvering the mobile computing device toward the location of the user, whether another spoken utterance is being directed at the mobile computing device. The method can further include, when the other spoken utterance is determined to be directed at the mobile computing device: causing the one or more motors to transition into a lower power state while the other spoken utterance is being directed at the mobile computing device, causing an automated assistant, which is accessible via the mobile computing device, to initialize performance of an action based on the other spoken utterance. The method can further include, when the other spoken utterance is complete and/or no longer being directed at the mobile computing device: causing the one or more motors to continue maneuvering the mobile computing device toward the location of the user.

In some implementations, the method can further include causing, in response to the spoken utterance being provided to the mobile computing device, one or more second motors of the mobile computing device to maneuver a display panel, which is attached to a first housing enclosure of the mobile computing device, away from a second housing enclosure of the mobile computing device. In some implementations, the method can further include, when the other spoken utterance is determined to be directed at the mobile computing device: causing the one or more second motors to transition into a lower power state while the other spoken utterance is being directed at the mobile computing device, causing an automated assistant, which is accessible via the mobile computing device, to initialize performance of an action based on the other spoken utterance. In some implementations, the method can further include, when the other spoken utterance is complete and/or no longer being directed at the mobile computing device: causing the one or more motors to complete maneuvering the first enclosure away from the second housing enclosure.

In some implementations, the method can further include, when the one or more motors have completed maneuvering the mobile computing device toward the location of the user: causing, based on the spoken utterance and/or the other spoken utterance, one or more third motors of the mobile computing device to maneuver the second housing enclosure away from a third housing enclosure of the mobile computing device, and maneuver a camera of the mobile computing device toward the user. In some implementations, the method can further include, when the one or more motors have completed maneuvering the mobile computing device toward the location of the user: causing, based on the spoken utterance and/or the other spoken utterance, one or more fourth motors to rotate the first housing enclosure about an axis that intersects a surface of a third housing enclosure of the mobile computing device in furtherance of directing the display panel at the user.

We claim:

1. A method implemented by one or more processors of a computing device, comprising:
   determining, based on processing of audio data detected via a plurality of microphones of the computing device:
   that a user has provided a spoken utterance that is directed to an automated assistant operating at least in part on the computing device, and
   a location of the user, that provided the spoken utterance, relative to the computing device,
   wherein the plurality of microphones are attached to a given housing enclosure of the computing device;
   in response to determining that the user has provided the spoken utterance:
   actuating a motor, included in the given housing enclosure with the plurality of microphones, to cause an orientation, of a display panel of the computing device, to be directed toward the determined location of the user,
   wherein the display panel is in a display panel housing enclosure,
   wherein the display panel housing enclosure is separate from the given housing enclosure, but is coupled to the given housing enclosure, and
   wherein actuation of the motor, included in the given housing enclosure, causes rotation of the display panel housing enclosure about an axis of the motor and via the coupling to the given housing enclosure;
   causing graphical content, generated by the automated assistant and that is responsive to the spoken utterance, to be rendered by the display panel of the computing device,
   wherein the graphical content is rendered by the display panel at least after the orientation is directed toward the determined location of the user;

identifying a distance condition in dependence on whether a response to the spoken utterance includes any graphical content;
determining that the location of the user fails to satisfy the distance condition relative to the computing device; and
actuating one or more wheel motors, that each drive one or more corresponding wheels that are coupled to the given housing enclosure, to cause the computing device to navigate closer to the user,
wherein actuating the one or more wheel motors to cause the computing device to navigate closer to the user is further in response to determining that the location fails to satisfy the distance condition.

2. The method of claim 1, further comprising:
determining that the response to the spoken utterance includes the graphical content;
wherein actuating the motor, to cause the orientation of the display panel to be directed toward the determined location of the user, is further in response to determining that the response to the spoken utterance includes the graphical content.

3. The method of claim 1, wherein the coupling of the display panel housing enclosure to the given housing enclosure is via a fulcrum, and wherein the display panel housing enclosure is further adjustable about a fulcrum axis, of the fulcrum, the fulcrum axis of the fulcrum being perpendicular to the axis of the motor.

4. The method of claim 1, wherein identifying the distance condition is further in dependence on one or more properties of the graphical content.

5. The method of claim 1, further comprising:
determining that an additional spoken utterance is being provided during actuating the motor to cause the orientation of the display panel to be directed toward the determined location of the user; and
adapting the actuating of the motor in response to determining that the additional spoken utterance is being provided during actuating the motor.

6. The method of claim 5, wherein adapting the actuating comprises transitioning the motor into a reduced power state.

7. The method of claim 1, further comprising:
prior to the user providing the spoken utterance and when the user is in the same location relative to the computing device:
determining, based on processing of prior audio data detected via the microphones of the computing device:
that a user provided a prior spoken utterance that is directed to the automated assistant, and
that audio-only content is responsive to the prior spoken utterance;
in response to determining that the user provided the prior spoken utterance and based on the audio-only content being responsive to the prior spoken utterance:
causing the audio-only content to be rendered via at least one speaker of the computing device and independent of any actuating of the motor.

8. The method of claim 7, further comprising:
determining that the location of the user satisfies an audio-only distance condition relative to the computing device;
wherein causing the audio-only content to be rendered independent of any actuating of the motor is in response to determining that the location satisfies the audio-only distance condition.

9. A computing device, comprising:
a given housing enclosure;
a plurality of microphones attached to the given housing enclosure;
wheels coupled to the given housing enclosure;
wheel motors within the given housing enclosure, each of the wheel motors driving a respective one of the wheels;
a display panel housing enclosure that is separate from the given housing enclosure, but is coupled to the given housing enclosure;
a motor having a motor axis, the motor being within the given housing enclosure and being actuable to cause rotation of the display panel housing enclosure about the motor axis and relative to the given housing enclosure;
memory storing instructions;
one or more processors executing the instructions to cause the one or more processors to:
determine, based on processing of audio data detected via the microphones:
that a user has provided a spoken utterance that is directed to an automated assistant operating at least in part on the computing device, and
a location of the user, that provided the spoken utterance, relative to the computing device;
in response to determining that the user has provided the spoken utterance:
actuate the motor to cause an orientation of the display panel to be directed toward the determined location of the user;
cause graphical content, generated by the automated assistant and that is responsive to the spoken utterance, to be rendered by the display panel,
wherein the graphical content is rendered by the display panel at least after the orientation is directed toward the determined location of the user;
determine that the location of the user fails to satisfy a distance condition that is relative to the computing device and that is dependent on whether a response to the spoken utterance includes any graphical content; and
actuate the wheel motors to cause the computing device to navigate closer to the user,
wherein in actuating the wheel motors to cause the computing device to navigate closer to the user, one or more of the processors are to actuate the wheel motors further in response to determining that the location fails to satisfy the distance condition.

10. The computing device of claim 9, wherein one or more of the processors, in executing the instructions, are further to:
determine that the response to the spoken utterance includes the graphical content;
wherein in actuating the motor, to cause the orientation of the display panel to be directed toward the determined location of the user, one or more of the processors are to actuate the motor further in response to determining that the response to the spoken utterance includes the graphical content.

11. The computing device of claim 9, further comprising a fulcrum that couples the display panel housing enclosure to the given housing enclosure, wherein the display panel housing enclosure is further adjustable about a fulcrum axis of the fulcrum, and wherein the fulcrum axis of the fulcrum is perpendicular to the motor axis of the motor.

12. The computing device of claim 5, wherein in identifying the distance condition one or more of the processors are to identify the distance condition further in dependence on one or more properties of the graphical content.

13. The computing device of claim 9, wherein one or more of the processors, in executing the instructions, are further to:
- prior to the user providing the spoken utterance and when the user is in the same location relative to the computing device:
  - determine, based on processing of prior audio data detected via the microphones of the computing device:
    - that a user provided a prior spoken utterance that is directed to the automated assistant, and
    - that audio-only content is responsive to the prior spoken utterance;
- in response to determining that the user provided the prior spoken utterance and based on the audio-only content being responsive to the prior spoken utterance:
  - cause the audio-only content to be rendered via at least one speaker of the computing device and independent of any actuating of the motor.

* * * * *